United States Patent [19]

Yamazaki

[11] 4,445,766
[45] May 1, 1984

[54] BINOCULARS WITH A DETACHABLE SMALL CAMERA

[75] Inventor: Shogo Yamazaki, Tokyo, Japan

[73] Assignee: Orinox Co., Ltd., Japan

[21] Appl. No.: 360,760

[22] Filed: Mar. 22, 1982

Related U.S. Application Data

[63] Continuation of Ser. No. 159,866, Jun. 16, 1980, abandoned, which is a continuation of Ser. No. 196,372, Jun. 16, 1978, abandoned.

[51] Int. Cl.³ .............................................. G03B 17/48
[52] U.S. Cl. ..................................... 354/79; 354/293; 350/502
[58] Field of Search ........................ 354/293, 76, 79; 350/19, 78, 79

[56] References Cited

U.S. PATENT DOCUMENTS

| | | | |
|---|---|---|---|
| 69,450 | 10/1867 | Kuebler et al. | 350/79 |
| 2,765,718 | 10/1956 | Beecher | 354/293 |
| 2,882,791 | 4/1959 | Moller et al. | 350/19 |
| 4,067,027 | 1/1978 | Yamazaki | 354/79 |

Primary Examiner—Monroe H. Hayes
Attorney, Agent, or Firm—James Creighton Wray

[57] ABSTRACT

Binoculars and a camera with a telephoto lens system are connected by inserting the telephoto lens barrel through a large lumen in the axis of connection of the binocular halves. A bush mounted within the lumen has an aligning groove for receiving an aligning lug on the telephoto lens barrel. A first section of the telephoto lens barrel is connected to the camera and a second section of the telephoto lens barrel connects to the first section. The camera body is positioned above the eyepiece barrels of the binoculars.

13 Claims, 5 Drawing Figures

BINOCULARS WITH A DETACHABLE SMALL CAMERA

This is a continuation of Application Ser. No. 159,866, filed June 16, 1980, which is a continuation of Application Ser. No. 196,372, filed June 16, 1978.

SUMMARY OF THE INVENTION

The present invention relates to binoculars of the type provided with a detachable small camera, not only to observe a distant object through the binoculars but also to photograph it by the small camera. In a single-lens reflex camera, though it is possible to observe a distant object, the three-dimensional observation is impossible. However, by using binoculars three-dimensional observation becomes possible, since binoculars have a function of a stereo-view finder. Under the present invention a small camera, e.g. a one ten (110) 16 mm film camera is put on the space above the barrels of binoculars. Thus, it becomes possible not only to observe three-dimensionally the object placed between the half hyper-focal distance and infinity, but also to photograph the object clearly by a telephoto lens assembly on the camera. The present invention provides binoculars with axis of the barrels larger than ones previously used, so as to insert a telephoto lens assembly in the axis and as a result make a camera easily mountable.

OBJECTS OF THE INVENTION

It is an object of the present invention to provide binoculars having a small camera for being able to observe a distant object as well as to photograph it at the same time.

It is a further object of the present invention to provide binoculars having a small camera which is able to photograph an object in the range between half hyper focal distance and infinity clearly by a telephoto lens assembly attached to the camera.

It is a further object of the present invention to provide binoculars having a small camera, formed of three independent components: a small camera, a telephoto lens assembly and binoculars, all compact and handy.

It is a further object of the present invention to provide binoculars having a small camera which works just as a binoculars only, when the small camera is detached from the binoculars.

These and other objects and advantages of the present invention will appear more clearly from the following specification in connection with the accompanying drawings in which.

Figure 3:
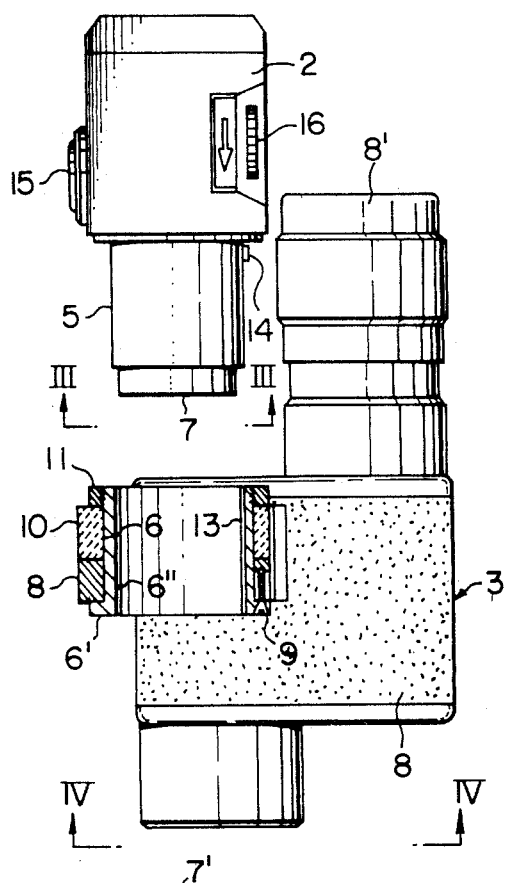
FIG. 3 is an explanatory drawing illustrating the process of putting the small camera on the binoculars.
Figure 5:
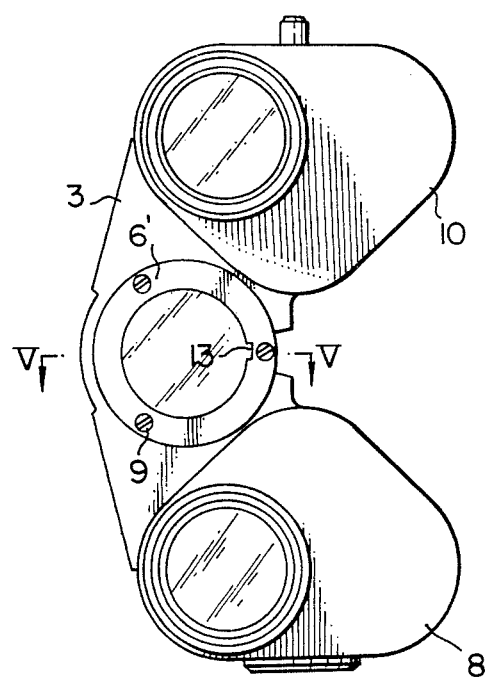
FIG. 5 is a front elevation of the binoculars from the line IV—IV side of FIG. 3.
Figure 4:
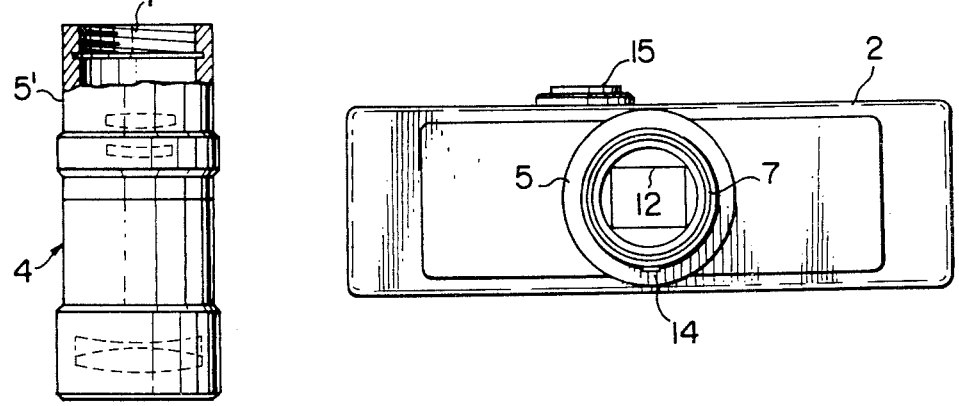
FIG. 4 is a front view of the camera from the line III—III side of FIG. 3.

The central part of FIG. 3 shows a sectional view of the axis on the line V—V of FIG. 5.

DETAILED DESCRIPTION OF THE DRAWINGS

Figure 1:
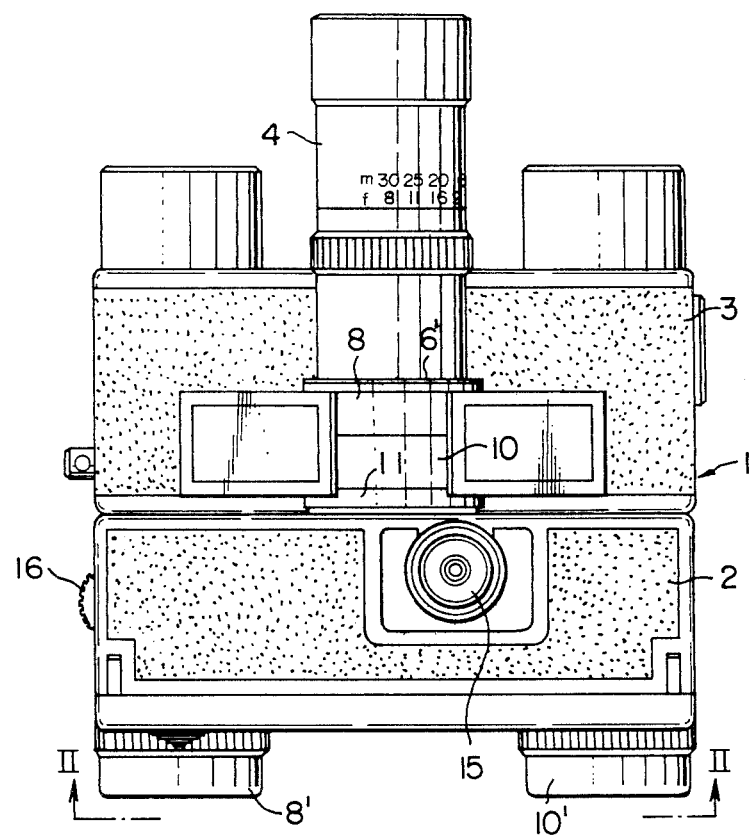
FIG. 1 is a plane view showing the binoculars and small camera of the invention.
Figure 2:
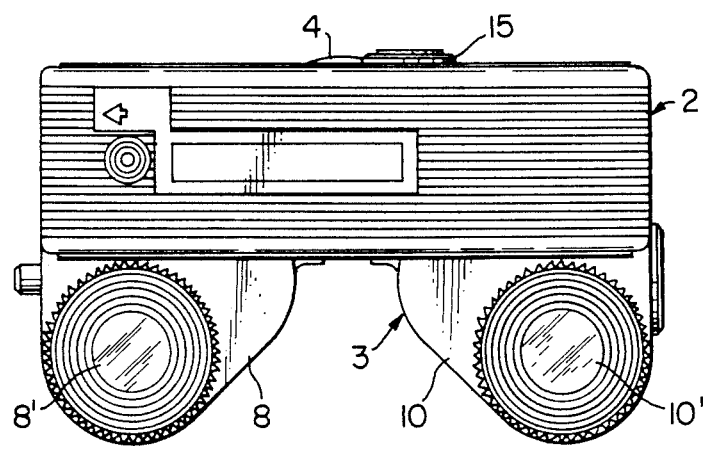
FIG. 2 is a rear elevation from the eyepiece lens side, i.e., the line II—II side of FIG. 1.

In FIG. 1, numeral 1 generally represents the whole body of binoculars and small camera, which is formed by installing small camera 2 in binoculars 3. Telephoto lens assembly 4 is installed in the small camera 2. As shown in FIG. 3, numeral 5 identifies the camera-side part of the barrel of the telephoto lens assembly 4. Axis of rotation 6 corresponds to the central axis of the binoculars 3 and is pipelike and has a larger diameter than the ones before so as to insert the camera-side barrel 5 into the opening inside of the axis.

More precisely, the barrel of the telephoto lens assembly 4 between the telephoto lens and the small camera 2, as shown in FIG. 3, is divided into the camera-side part 5 and the telephoto lens-side part 5'. The two parts are combined by means of binding screw 7, 7' which are respectively formed on the both ends of the each barrel parts, in other words, on the front end of the camera-side barrel 5 and on the back end of the telephoto lens-side barrel 5' to form the whole body of the telephoto lens assembly 4. A bush 6" with a flange 6' thereon, which works as a bearing, is inserted into the cylindrical axis 6 and fixed to the axis 6 of the fixed barrel 8 of the binoculars 3 by means of screws 9 in the flange 6'. Bush 6" is screwed to the axis 6 of the moving barrel 10 by means of a tightening ring 11.

The camera-side barrel 5 of the telephoto lens assembly is designed for the screw thread part 7 thereon to appear beyond the flange 6' when it is inserted into the bush bearing 6". By turning the screw thread part 7' of the telephoto lens-side barrel 5' onto said part 7 of the camera-side barrel, the telephoto lens 4 is fixed on the flange 6'.

The telephoto lens assembly is rotatable within the cylindrical bearing 6", while the range of the photographing 12 of the camera 2 remains horizontally and vertically parallel to the observing range decided by the eyepiece lenses 8', 10' of the binoculars 3. A guiding groove 13 is formed longitudinally inside the bearing 6", and a guiding projection 14 to be inserted in groove 13 is formed at the appropriate point of the outer surface of the camera-side barrel 5 to be inserted in place. In this way, the telephotographing range 12 for the camera-side barrel 5 becomes to be well conform to the observing range of the binoculars 3. After deciding range of photographing in the way as mentioned above, the screw thread 7' fashioned on the back end part of the telephoto lens-side barrel is turned into the screw threaded part 7 formed on the front end part of the camera-side barrel 5 of the telephoto lens assembly 4. The screw threaded part 7 appearing in front of the flange 6' on the bearing 6", so as to insert the camera-side barrels in the bearing 6", to fix the position of camera in zenith and to make the camera ready to take a photograph.

Although in the present invention the guiding groove 13 is shown formed inside the bearing 6" and the guiding projection 14 is made on the outer surface of the camera-side barrel 5, they are reversible. It is possible that the guiding groove 13 be formed on the outer surface of the camera-side barrel 5 and the guiding projection 14 be formed inside the bearing 6". Shutter release button 15 and film wind know 16 are provided exteriorly on the camera where they may be reached after the camera is mounted on the binoculars.

Now, hyper-focal distance will be calculated under such conditions as minimum circle of confusion (Z) is 1/60 mm, focal length (f) of the telephoto lens to be used is 60 mm, diaphram (F) is 8.

Hyper-focal distance (b)=$f^2$/ZF;

that is $(b) = (60^2)/(8 \times 1/60) = 27000$ mm in this case half hyper-focal distance $= b/2 = 13.5$ m. Therefore the depth of camera focus is from 13.5 m to infinity. The purpose of binoculars is originally to observe distant objects, and binoculars are usually used for observing objects located more than 10 m away from the point where the observer is standing, though the distance depends on the performance of each binoculars. Therefore by attaching camera having telephoto lens to binoculars, not only observation of distant objects but also photographing thereof become possible. Furthermore, recently developed ultrafine-grain photosensitive film make enlargement detailed, easy, and accurate. Therefore, the above mentioned photographing became enough realizable.

The binoculars having a detachable small camera on the top of the barrels thereof as mentioned above enables the observing of distant objects in three dimensions and also the photographing of the objects precisely and timely just by pressing a shutter release button 15 of the camera 2 in time with the state of the object you want to take a photograph of. The advantage of the binoculars having a detachable camera the present invention as mentioned above enhanced remarkably the value in use of binoculars as compared with the former ones. In this invention just the small camera is enough to take a photograph of distant objects, which required an expensive and bulky telephoto lens assembly and camera before.

In addition, the binoculars of the present invention have high productivity, since binoculars and small cameras can be produced and quality checked separately. Since it is easy for a user to put a camera and binoculars together into a complete body for himself, a user can use the binoculars with the present invention in either way; as just common binoculars or, by putting binoculars and camera together by himself, for taking a photograph as well as observing precisely the object, as need arises.

Furthermore, in the present invention any telephoto lens, the half hyper-focal distance of which is within the observable distance of the binoculars, is usable.

What is claimed is:

1. Binoculars with a detachable camera comprising a camera assembly having a camera body and camera lens means with an elongated camera barrel extending from the camera body, and a binoculars assembly having first and second binocular barrels with parallel optical axes and an elongated annular axle connected to the binocular barrels for adjusting relative positions of the barrels, the axle being positioned between the binocular barrels and being offset from a plane or planes containing the binocular optical axes, the axle being axially parallel to the binocular barrels and being hollow and having an inner size sufficient for selectively receiving the camera barrel and insufficient for receiving at least a part of the camera body, the camera barrel being removably received within the annular axle with an optical axis of the camera barrel parallel to the binocular optical axes, and wherein means are provided for selectively holding the camera barrel within the axle, thereby detachably connecting the camera assembly to the binoculars assembly, wherein the camera barrel comprises a camera-side barrel for joining to the camera and a remote barrel for detachably joining axially to the camera-side barrel remote from the camera body, the annular axle having annular inner bearing means for holding the camera-side barrel therein, the camera barrel having a distal end projecting through the axle and the distal end having first threaded joining means thereon, and the remote barrel having a proximal end with second threaded joining means thereon for joining the first threaded joining means on the camera side barrel portion extending from the axle, and the proximal end of the remote barrel having means for abutting the axle to firmly fix the barrels and the camera to the axle.

2. Binoculars with a detachable camera according to claim 1 characterized in that a guiding groove is formed longitudinally inside the bearing means and a guiding projection to be inserted in said groove is formed at the appropriate point of the outer surface of the camera-side barrel for said camera-side barrel to be inserted in place.

3. Binoculars with a detachable camera according to claim 1 characterized in that a first guiding means is formed longitudinally on the outer surface of the camera-side barrel and a complimentary guiding means to be inserted in said first guiding means is formed at an appropriate point inside the bearing means for said camera-side barrel to be inserted in place.

4. The apparatus of claim 1 wherein the hollow portion of the elongated axle comprises a cylindrical opening.

5. The apparatus of claim 4 wherein the opening has a cylindrical bearing lining for holding the camera barrel.

6. The apparatus of claim 5 wherein the camera barrel comprises a first section for attaching to the camera body and for inserting through the cylindrical bearing and a second section for selectively attaching to the first section.

7. The apparatus of claim 5 wherein the lining comprises a cylindrical bush having a cylindrical opening therethrough.

8. The apparatus of claim 7 wherein the bush has a flange at a first end thereof for abutting an end face of the axle and attaching means for attaching the bush to the axle.

9. The apparatus of claim 8 wherein the attaching means comprise screws inserted through the flange and into the axle.

10. The apparatus of claim 8 wherein the attaching means comprises external threads on a portion of the bush opposite the flange which extends beyond the axle and an internally threaded collar for attaching to the threads on the bush.

11. The apparatus of claim 8 wherein the camera barrel comprises a first section with means for connection to the camera body and for selectively inserting through the bush opening and a second section with means for detachably connecting the first section to the second section remote from the camera body, the second section having means for abutting the annular flange to fix the camera barrel with respect to the axle.

12. The apparatus of claim 11 further comprising a first aligning means within the bush and a second cooperating aligning means on the first section of the camera barrel for aligning the first section with the bush.

13. The apparatus of claim 12 wherein the first aligning means comprises a longitudinal groove in the bush and the second aligning means comprises a lug on the camera barrel for fitting within the groove.

* * * * *

UNITED STATES PATENT AND TRADEMARK OFFICE
CERTIFICATE OF CORRECTION

PATENT NO. : 4,445,766
DATED : May 1, 1984
INVENTOR(S) : Shogo Yamazaki

It is certified that error appears in the above-identified patent and that said Letters Patent is hereby corrected as shown below:

On the title page, insert -- (73) Assignee: Ajia Amerikan Boueki Kabushiki Kaisha --.

Signed and Sealed this

Fifteenth Day of April 1986

[SEAL]

Attest:

DONALD J. QUIGG

Attesting Officer

Commissioner of Patents and Trademarks